Feb. 1, 1949.  D. J. WHITTINGHAM  2,460,664
HYDRAULIC PRESSURE CONTROL MEANS
Filed Feb. 26, 1945  2 Sheets-Sheet 1
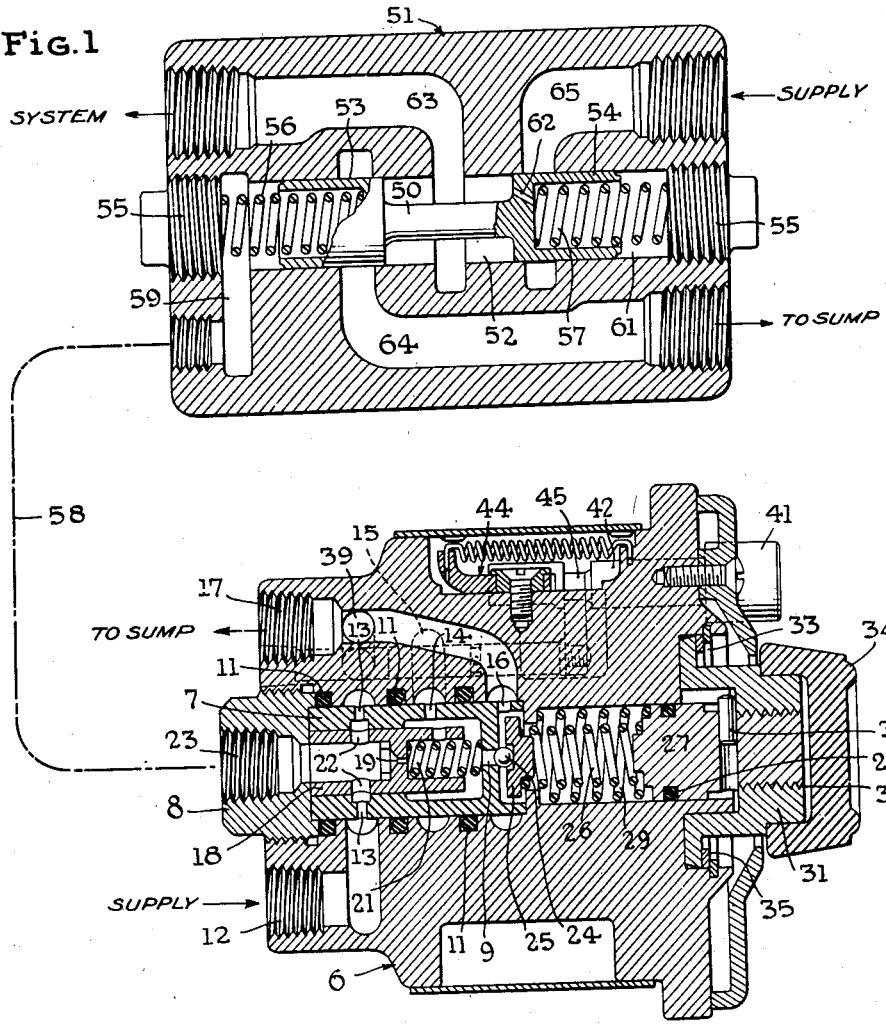
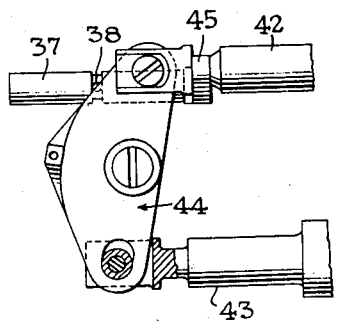
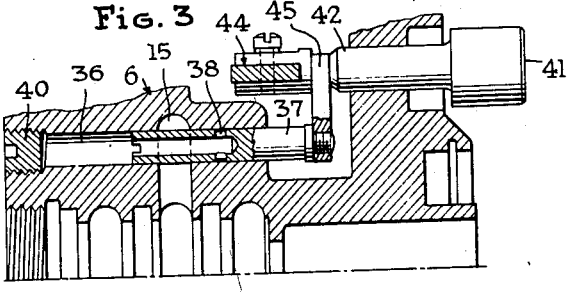
Inventor
David J. Whittingham
By
Attorneys

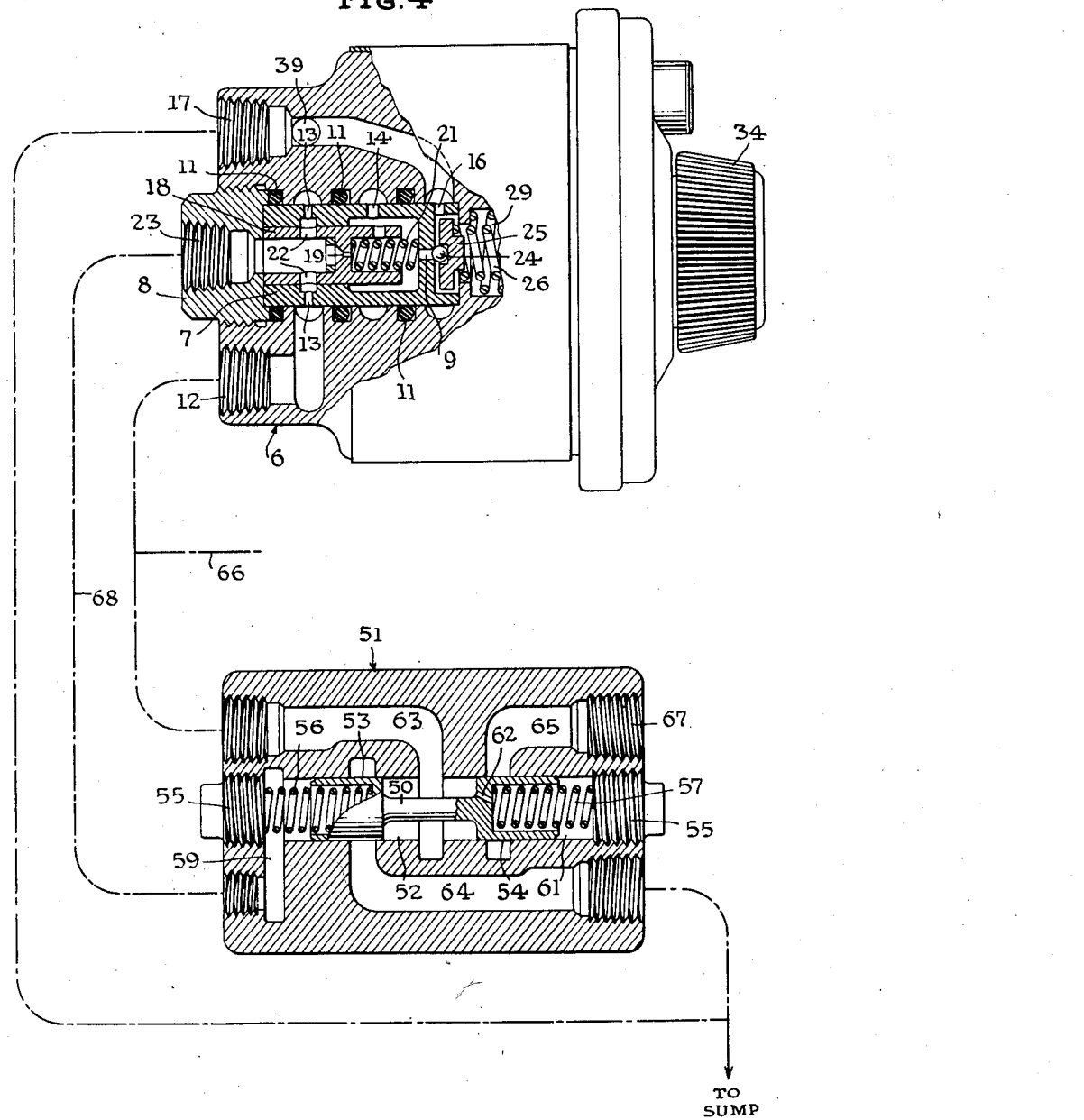

Patented Feb. 1, 1949

2,460,664

UNITED STATES PATENT OFFICE 2,460,664

HYDRAULIC PRESSURE CONTROL MEANS

David J. Whittingham, Watertown, N. Y., assignor to The New York Air Brake Company, a corporation of New Jersey Application February 26, 1945, Serial No. 579,867

9 Claims. (Cl. 50—12)

This invention relates to valve mechanisms for controlling hydraulic pressure.

In its broadest aspect the invention is concerned with a pilot valve mechanism which when connected to a source of hydraulic liquid under pressure will maintain in a branch line a constant lower pressure. This branch line pressure may be varied progressively by changing the stress on a loading spring forming part of the pilot valve mechanism. This device, though primarily intended for use as a pilot valve, can be used to supply a continuous stream of liquid at a uniform pressure.

In another aspect, the invention involves the use, with such a pilot valve, of a large capacity pressure controlled piston valve. This combination of pilot valve and controlled piston valve can be used for a number of different purposes by modifying the connections to the piston valve. Also the characteristics of the piston valve can be varied by varying its spring loading. For example, the pilot valve and piston valve may be used together as a combined supply and relief valve to maintain a system or a line at a uniform pressure and to supply demands for hydraulic liquid at such uniform pressure. Another use of the pilot valve and piston valve, involving changed connections, is as a sensitive relief valve of large capacity.

The principles of operation will be explained after descriptions of practical embodiments which are illustrated in the accompanying drawings.

In the drawings:

Figure 1 is a diagrammatic axial section of the pilot valve and the related piston valve; the connection between the two being indicated by a dot and dash line, all other connections being indicated by legends.

Figure 2 is a fragmentary view of a push-button device used to actuate a relief valve forming part of the pilot valve mechanism.

Figure 3 is a fragmentary axial section through the relief valve and its seat.

Figure 4 is a view somewhat similar to Figure 1 but showing the parts which appear in Figure 1 connected to function as a sensitive relief valve of a large capacity.

Obviously the pilot valve and the pressure controlled piston valve may be located in any desired positions and they need not be closely adjacent with one another. It is convenient, but not strictly necessary, to supply both with hydraulic liquid under pressure from the same source.

For convenience only statements of direction will hereinafter be made with reference to the positions of parts in the drawings.

The body of the pilot valve is illustrated at 6. This is counterbored coaxially from opposite ends, the two counterbores communicating within an annular flange. In the left-hand counterbore, which is the one to the back of the body as it is mounted, there is inserted a valve seat bushing 7. This is held in place by a plug 8 which is threaded into the body 6 and which holds the bushing 7 against the flange at the inner end of the counterbore.

The bushing 7 may be described as cup-shaped with a marginal rim at its inner end. The left-hand portion of the bushing 7 forms the valve seat proper, the bore of the bushing being somewhat enlarged at the inner end. There is a port 9 through the partition which forms the inner end of the cup-shaped bushing, and this serves as a seat for a loaded valve hereinafter described.

The bushing 7 is not pressed in place but is sealed by three encircling gaskets 11. These are formed of some rubber-like synthetic plastic not harmfully affected by the hydraulic liquid to be handled by the valve. The gaskets segregate three port grooves which encircle the bushing. Considered from left to right the first of these is a groove which communicates with the supply connection 12 and with series of radial supply ports 13 formed in the bushing. The second groove communicates with the port 14 and also with a passage 15 leading to the relief or vent valve shown in Figure 3 and hereinafter described. The port 14 leads from the space within the enlarged right-hand end of the bushing. The third groove connects a port 16 with the sump or low pressure connection 17. The port 16 leads from the space within the body 6 at the right of the bushing 7.

The pilot valve proper is shown at 18 and is of generally tubular configuration with a transverse partition located at about mid length of the valve. In the partition there is a restricted port 19. This valve is biased to the left by a coil compression spring 21 which is received within the counterbore in the valve 18 and reacts against the bottom of the bushing 7 around the port 9.

When the valve 18 is in its left most position, as shown in Figure 1, in which position it is arrested by collision with the plug 8, ports 22 in the valve to the left of port 19, register with the supply ports 13 in the bushing. At the extreme limit of motion to the right the valve 18 substantially closes the ports 13. The space to the left of the valve 18 communicates freely with the branch connection 23.

The port 9 is controlled by a ball relief valve 24. This is mounted in a recess in a spring seat 25. A coil compression spring 26 reacts between the seat 25 and an adjustable seat 27 which is slidable in the forward counterbore. A ring gasket 28 is used to prevent leakage of oil past the seat 27. The seat 27 is biased to the right, that is forward, by a coil compression spring 29 which reacts between the seat 27 and the shoulder in the inner end of the counterbore. The spring seat is held against rotation by a radial pin 30 which moves in a keyway cut in the side wall of the counterbore.

The position of the spring seat 27 may be adjusted by turning a nut 31, which is threaded at 32 on the outer end of the spring seat 27 and whose margin is confined by the snap ring 33 which engages the body 6 and thus affords a swivel connection between the nut 31 and the body 6. The member 35 is a thrust ring interposed between the snap ring 33 and the marginal flange on nut 31. A plastic knob 34 is permanently mounted on the nut 31 and is knurled as shown in Figure 4 to afford a good finger grip. By turning the knob 34 the loading of the spring 26 may be adjusted.

If liquid under pressure is supplied to connection 12 it will pass through the ports 13 and 22 and develop pressure in the connection 23 to the left of the valve 18. Assume that flow from the port 14 is prevented, as normally is the case. There will be flow through the restricted port 19 into the space between the valve 18 and the loaded relief valve 24, so that pressure develops to the right of valve 18. The valve 24, however, will unseat slightly and limit the pressure acting on the right-hand end of valve 18 to an amount determined by the adjustment of the stress on the spring 26. The result is that the port 19 and the relief valve 24 establish a pressure which assists the spring 21 in urging the valve 18 to the left. In consequence the valve assumes a position in which the ports 13 are so throttled that the valve is in a state of equilibrium.

Since the valve 18 performs both a supply function and a continuous venting function it will maintain the pressure in the connection 23 whether or not there is continuous out-flow through that connection. The dimensions of the ports 13, 22 and 19 control the rate of response of the valve 18, and a valve of any given design is necessarily subject to some limitation as to the rate at which the out-flow through the passage 23 may vary without impairing the regulatory function.

If port 14 is opened wide so that no back pressure can be developed against the right-hand end of the valve 18, the valve will close ports 13. To permit this operation is the purpose of the port 14. As best indicated in Figure 3 the port 14 communicates with the passage 15 which leads to a bore 36 closed at one end by plug 40 and arranged to receive an axially movable tubular valve 37.

The valve 37 is shown in closed position in Figure 3. When moved to the left the side ports 38 in the valve 37 connect passage 15 with a passage 39 which leads to the sump connection 17. The valve 37 is operated by a pair of push-buttons; one of which, 41, is shown in Figures 1 and 3.

The push-button 41 is mounted on a stem 42 and a similar push-button is mounted on the stem 43. They actuate, selectively and in opposite direction, a snap acting rock lever 44 which is connected by an off-set bracket 45 with the valve 37. Thus if the button 41 is pushed the valve 37 is set in venting position and retained there. It may be restored to closed position by pressing the button connected to part 43.

Thus the pressure in the connection 23 can be adjusted by turning the knob 34, and may be quickly dissipated by pressing the button 41.

The pressure controlled piston valve which is used with the pilot valve will now be described when connected as shown in Figure 1.

The valve has a body 51 with an axial bore 52 in which works a piston valve comprising cup-shaped heads 53 and 54 connected by a reduced stem 50. The neutral position of the valve, which is a lap position in which all flows are cut off, is determined by two oppositely acting coil compression springs 56 and 57. These react against plugs 55 which respectively are screwed into opposite ends of the bore 52.

A branch line 58 which leads from the connection 23 of the pilot valve is diagrammed by means of a dot and dash line and communicates with the space 59 at the outer end of the head 53. The space 61 at the outer end of the other head 54 is connected by a port 62 with the space between the heads 53 and 54. This space is always in communication with the middle port 63 which is called the controlled port, this being the port connected with the line or system in which pressure is to be maintained constant. The legend "system" is applied to the connection at the end of this port.

In the mid-position of the valve the heads 53 and 54 close corresponding ports 64 and 65. Displacement of the valve in one or the other direction from mid-position connects the control port 63 selectively with ports 64 or 65, the other of said ports being then blanked.

The port 64 is always a discharge port. The port 65 is a supply port, that is hydraulic liquid under pressure is supplied to the port through the supply connection indicated by legend. The arrangement shown in Figure 1 serves as a pressure regulating supply and relief mechanism. As stated, the supply port 65 may lead from the same point as the supply to port 12.

Since the pressure in the control port 63 is always effective in the space 61 and since the pilot valve maintains a constant pressure in the space 59 the mechanism will function to maintain a substantially constant pressure in the port 63 and will do so even when liquid is withdrawn from or supplied to said port by means external to the valve.

For use as a relief valve the ports are connected as shown in Figure 4. The pilot valve in body 6 is unchanged and requires no further description.

The connection 66 serves as a supply connection to the pilot valve in housing 6. The pilot valve functions to establish a related but lower pressure in the connection 68 which leads from the branch connection 23 to the space 59. Since the pressure in 66 is effective in space 61 and since the pilot valve maintains a constant pressure in the space 59, the piston valve will move in a venting direction if the pressure in the connection 66 rises above the chosen value. It should be observed that since the pressure in 68 is lower than the pressure in 66 the spring 56 must offer such opposition as to neutralize the differential.

The arrangement shown in Figure 4 provides a relief valve of large capacity which is precise in operation and whose control point can be adjusted over a wide range. If the vent valve 37 is opened by pressing the button 41 the piston valve will move to venting position and remain there.

Referring generally to the pilot valve, it will be observed that the valve 18 functions as a piston which responds to the pressure differential between two working spaces at its opposite ends. The port 19 forms a restricted communication between these two working spaces. The working space to the left of the piston 18 in Figure 1 is subject to the controlled pressure. The piston 18 is urged in opposition to this pressure by the coil compression spring 21 and also by a hydraulic pressure in the working space to the right of the piston valve 18, which pressure is limited by the relief action of the valve 24. The piston 18 acts also as a valve which controls the supply ports 13 throttling these ports in response to rise of pressure in the first named working space, i. e. in the controlled connection 23. Consequently the piston 18 assumes a position such that the ports 13 will be throttled sufficiently to establish the desired pressures in the connection 23.

The amount of oil vented through the valve is negligible. The amount so vented can be reduced by reducing the size of the port 19, but there is a limit to the amount of reduction of port size because reduction slows the response of the valve. The size of the port 19 is preferably as small as the required rate of response permits.

It should be noted that with the parts arranged as shown in Figure 1 relative strengths of the springs 56 and 57 enter as a factor in determining the pressure which will be maintained in the connection 63. It is thus possible to maintain in the connection 63 a pressure which is higher or lower than that maintained in the space 59 by the operation of the valve 6.

While I prefer to form the port 19 through the valve 18 the ultimate function of the port is to afford restricted flow between the two working spaces at opposite ends of the valve. Any arrangement which will attain this result is workable, but the location of the port in the piston itself affords a favorable friction reaction on the valve and renders the valve somewhat more sensitive.

In the above description the pilot valve has been described as capable of controlling a flow and as capable of maintaining a uniform static pressure for any desired purpose. Two examples of the latter have been described with the idea of disclosing the versatility of the pilot valve and its many valuable characteristics. No necessary limitation to any of the suggested arrangements is implied. The scope of the invention is defined solely by the claims.

What is claimed is:

1. In a device for deriving a uniform hydraulic pressure from a supply of hydraulic fluid at a pressure higher than said derived pressure but not necessarily uniform, the combination of a supply connection; a movable abutment; means forming a first and a second working space separated by said abutment, the first of said spaces being subject to the derived pressure and being in restricted communication with the second working space; a loaded relief valve serving to vent hydraulic fluid from said second working space; valve means actuated by said abutment, controlling flow from said supply connection to the first working space, and arranged to restrict such flow as the abutment moves in response to predominant pressure in the first working space; and yielding means arranged to oppose such motion.

2. In a device for deriving a uniform hydraulic pressure from a supply of hydraulic fluid at a pressure higher than said derived pressure but not necessarily uniform, the combination of a supply connection; a movable abutment; means forming a first and a second working space separated by said abutment, the first of said spaces being subject to the derived pressure and being in restricted communication with the second working space; a loaded relief valve serving to vent hydraulic fluid from said working space; means operable to adjust the loading of said relief valve; valve means actuated by said abutment, controlling flow from said supply connection to the first working space, and arranged to restrict such flow as the abutment moves in response to predominant pressure in the first working space; and yielding means arranged to oppose such motion.

3. In a device for deriving a uniform hydraulic pressure from a supply of hydraulic fluid at a pressure higher than said derived pressure but not necessarily uniform, the combination of a supply connection; a cylinder; a piston dividing the cylinder into a first and a second working space, in the first of which the derived working pressure reacts upon the piston; a loaded relief valve serving to limit pressure in the second working space; means offering a restricted flow-path between said working spaces and having a flow capacity not greater than the maximum flow capacity of the relief valve; valve means actuated by the piston, controlling flow from said supply to the first working space, and arranged to restrict such flow as the piston moves in response to predominant pressure in the first working space; and yielding means arranged to oppose such motion.

4. In a device for deriving a uniform hydraulic pressure from a supply of hydraulic fluid at a pressure higher than said derived pressure but not necessarily uniform, the combination of a supply connection; a cylinder; a piston dividing the cylinder into a first and a second working space, in the first of which the derived working pressure reacts upon the piston; a loaded relief valve serving to limit pressure in the second working space; means operable to adjust the loading of said relief valve; means offering a restricted flow-path between said working spaces and having a flow capacity not greater than the maximum flow capacity of the relief valve; valve means actuated by the piston, controlling flow from said supply to the first working space, and arranged to restrict such flow as the piston moves in response to predominant pressure in the first working space; and yielding means arranged to oppose such motion.

5. The combination defined in claim 3 in which the means offering a restricted flow-path comprises a port formed directly through the piston.

6. The combination defined in claim 3 in which the valve means actuated by the piston comprises coacting ports formed in the cylinder and in the piston.

7. The combination defined in claim 3 in which the valve means actuated by the piston comprises coacting ports formed in the cylinder and in the piston and the means offering a restricted flow-path comprises a port formed directly through the piston.

8. In a device for deriving a uniform hydraulic pressure from a supply of hydraulic fluid at a pressure higher than said derived pressure but not necessarily uniform, the combination of a supply connection; a movable abutment; means enclosing a first working space and a second working space separated by said abutment, said first working space being subject to the derived pressure and being in restricted communication with the second working space; a loaded relief valve serving to vent hydraulic fluid from said second working space; means operable to vent the second working space completely; valve means actuated by said abutment, controlling flow from said supply connection to the first working space, and arranged to restrict such flow as the abutment moves in response to predominant pressure in the first working space; and yielding means arranged to oppose such motion.

9. In a device for deriving a uniform hydraulic pressure from a supply of hydraulic fluid at a pressure higher than said derived pressure but not necessarily uniform, the combination of a supply connection; a movable abutment; means enclosing a first working space and a second working space separated by said abutment, said first working space being subject to the derived pressure and being in restricted communication with the second working space; a loaded relief valve serving to vent hydraulic fluid from said second working space; means operable to adjust the loading of said relief valve; means operable independently of said adjusting means to vent the second working space completely; valve means actuated by said abutment, controlling flow from said supply connection to the first working space, and arranged to restrict such flow as the abutment moves in response to predominant pressure in the first working space; and yielding means arranged to oppose such motion.

DAVID J. WHITTINGHAM.

REFERENCES CITED

The following references are of record in the file of this patent:

UNITED STATES PATENTS

| Number | Name | Date |
|---|---|---|
| 802,091 | Anderson | Oct. 17, 1905 |
| 1,611,079 | Roschanek | Dec. 14, 1926 |
| 2,037,179 | Robart | Apr. 14, 1936 |
| 2,171,613 | Vance | Sept. 5, 1939 |
| 2,225,916 | Maglott | Dec. 24, 1940 |
| 2,366,596 | Clifton | Jan. 2, 1945 |
| 2,377,227 | Griswold | May 29, 1945 |

FOREIGN PATENTS

| Number | Country | Date |
|---|---|---|
| 403,787 | Great Britain | Jan. 4, 1934 |
| 663,214 | France | Apr. 8, 1929 |